(12) United States Patent
Ueki et al.

(10) Patent No.: US 7,900,780 B2
(45) Date of Patent: Mar. 8, 2011

(54) BALLAST WATER INTAKE AND TREATMENT SYSTEM

(75) Inventors: Shuji Ueki, Tokyo (JP); Masahiro Saito, Tokyo (JP); Noboru Takemura, Tokyo (JP); Yukirou Kadomoto, Tokyo (JP); Takeo Nojiri, Tokyo (JP); Izumi Onishi, Tokyo (JP); Masahiro Kuwajima, Tokyo (JP); Masabumi Matsumoto, Tokyo (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 0 days.

(21) Appl. No.: 11/889,808

(22) Filed: Aug. 16, 2007

(65) Prior Publication Data

US 2009/0045134 A1 Feb. 19, 2009

(51) Int. Cl.
*B01D 35/00* (2006.01)

(52) U.S. Cl. .............. 210/399; 210/170.05; 210/170.11; 210/172.1; 210/242.1; 210/259; 210/297; 114/125

(58) Field of Classification Search .................. 210/96.1, 210/143, 172.1, 740, 627, 760, 764, 744, 210/121–129, 170.05, 170.11, 242.1, 259, 210/321.6, 747, 806, 170.1, 170.09; 114/125
See application file for complete search history.

(56) References Cited

U.S. PATENT DOCUMENTS

| | | | | |
|---|---|---|---|---|
| 3,797,437 A | * | 3/1974 | Cowles | 114/74 A |
| 5,047,156 A | * | 9/1991 | Sullivan | 210/744 |
| 5,692,451 A | * | 12/1997 | Pastore | 114/125 |
| 5,932,112 A | * | 8/1999 | Browning, Jr. | 210/750 |
| 6,125,778 A | * | 10/2000 | Rodden | 114/74 R |
| 6,183,646 B1 | * | 2/2001 | Williams et al. | 210/636 |
| 6,348,148 B1 | * | 2/2002 | Bosley | 210/170.11 |
| 6,432,304 B1 | * | 8/2002 | Nguyen | 210/172.5 |
| 6,869,540 B2 | * | 3/2005 | Robinson et al. | 210/760 |
| 6,904,858 B2 | * | 6/2005 | Pastore | 114/125 |
| 7,128,009 B2 | * | 10/2006 | Randall | 114/125 |
| 2003/0015481 A1 | * | 1/2003 | Eidem | 210/760 |
| 2003/0205136 A1 | * | 11/2003 | McNulty | 95/265 |

(Continued)

FOREIGN PATENT DOCUMENTS

| | | | |
|---|---|---|---|
| JP | 2004-160437 | | 6/2004 |
| WO | WO 2005/092801 | * | 6/2005 |

OTHER PUBLICATIONS

"The New Convention: Ballast Water Convention Adopted," Global Ballast Water Management Programme, http://globallast.imo.org/mepc.htm <last accessed on Oct. 31, 2007>.

*Primary Examiner* — Tony G Soohoo
*Assistant Examiner* — David C Mellon
(74) *Attorney, Agent, or Firm* — Duane Morris LLP

(57) ABSTRACT

A ballast water intake and treatment system is disclosed, the system including a membrane treatment unit arranged in or on a ship hull for the separation of microorganisms of no smaller than a given size and organized to execute filtration during the intake of sea water or fresh water outside the hull into ballast tanks by the use of an intake pump installed consecutively with the membrane treatment unit. The system checks the invasion of microorganisms, etc. of no smaller than a given size during the intake of ballast water and allows ballast water free of microorganisms, etc. of no smaller than a given size to be fed into ballast tanks.

2 Claims, 6 Drawing Sheets

U.S. PATENT DOCUMENTS

| | | | |
|---|---|---|---|
| 2004/0065614 A1* | 4/2004 | Gordon et al. | 210/650 |
| 2004/0079706 A1 | 4/2004 | Mairal et al. | |
| 2004/0099608 A1* | 5/2004 | Leffler et al. | 210/704 |
| 2007/0056907 A1* | 3/2007 | Gordon | 210/652 |
| 2007/0246424 A1* | 10/2007 | Honda et al. | 210/636 |
| 2009/0218297 A1* | 9/2009 | Glessner et al. | 210/767 |

* cited by examiner

BALLAST WATER INTAKE AND TREATMENT SYSTEM

FIELD OF THE INVENTION

Presently disclosed embodiments relate to a ballast water intake and treatment system. In particular, disclosed embodiments relate to a ballast water intake and treatment system which can check the invasion of microorganisms or bacteria of no smaller than a given size by the use of membrane during the intake of ballast water and feed ballast tanks with ballast water which does not include microorganisms, etc. of no smaller than a given size.

BACKGROUND

Ballast water drained from cargo ships, such as container ships, contains aquatic organisms and bacteria which inhabit ports where the ballast water is drawn. As the ships move, the organisms and bacteria are conveyed to other countries.

In serious consideration of the above background, a diplomatic conference at the International Maritime Organization (IMO) adopted the International Convention for the Control and Management of Ships' Ballast Water and Sediments to make the obligation of implementing ballast water control apply to ships built from 2009 onward.

Consequently, it is required to make it possible to drain clean ballast water that meets the International Convention for the Control and Management of Ships' Ballast Water and Sediments.

In addition, the above-mentioned Convention prescribed the ballast water discharging standard as shown in Table 1.

TABLE 1

|  | Items | Ballast Water Quality Criteria | Size |
|---|---|---|---|
|  | Aquatic Organisms | 10 unit/ml | 10-50 μm |
|  | Aquatic Organisms | 10 unit/m$^3$ | 50 μm or more |
| Indicator Microbes | *Escherichia Coli* | 250 cfu/100 ml | / |
|  | *Vibrio cholerae* (O1 and O139) | 1 cfu/100 ml | / |
|  | Genus *Enterococcus* | 100 cfu/100 ml | / |

Accordingly, it is now a matter of great urgency to develop a sterilization and/or elimination technology in the ballast water to address the problems described above.

Conventionally, a technology for sterilization has been offered including injecting ozone into ballast water in parallel with injecting steam, and further generating micro bubbles of ozone to promote formation of hydroxyl radical to reduce consumption of ozone, as seen in Japanese Unexamined Patent Application No. 2004-160437 (JP).

SUMMARY

There is a limit to reducing the consumption of ozone for sterilizing ballast water. Against a backdrop of this fact, the inventors found that the assured removal of microorganisms of no smaller than a given size with the adoption of membrane, and the killing of only the remaining bacteria of smaller sizes with ozone achieved remarkably reduced consumption of ozone, and resulted in the presently disclosed embodiments.

An object of the disclosed embodiments is to provide a ballast water intake and treatment system which can check the invasion of microorganisms or bacteria of no smaller than a given size by the use of membrane during the intake of ballast water and feed ballast tanks with ballast water which does not include microorganisms, etc. of no smaller than a given size. Other objects of the presently disclosed embodiments will be clarified in the following disclosure.

BRIEF DESCRIPTION OF THE DRAWINGS

Various aspects of the present disclosure will be or become apparent to one with skill in the art by reference to the following detailed description when considered in connection with the accompanying exemplary non-limiting embodiments, wherein.

DETAILED DESCRIPTION

Figure 1:
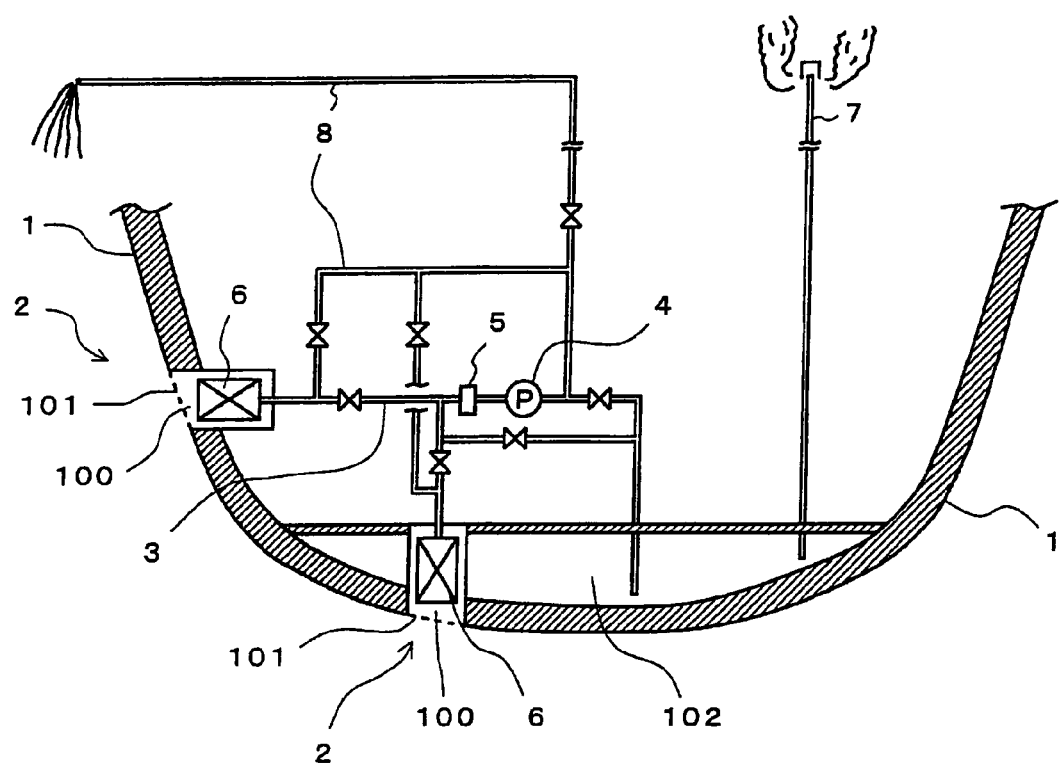
FIG. 1 is a cross-section view illustrating an exemplary embodiment of a ballast water intake and treatment system installed in a ship such as a tanker.
Figure 2:
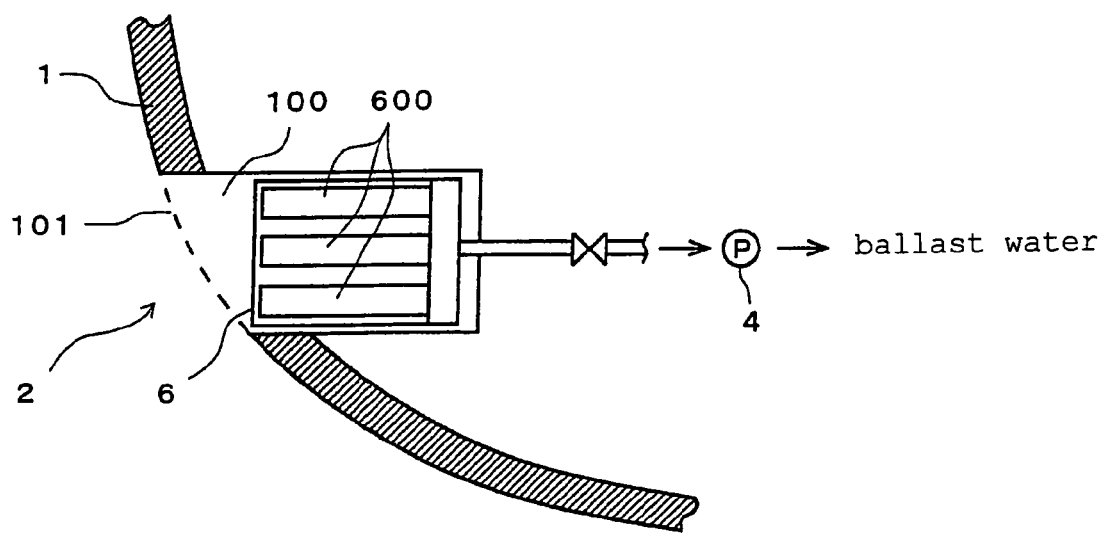
FIG. 2 is an enlarged sectional view of the intake part of FIG. 1.

FIG. 1 illustrates a cross section of a ship provided with a ballast water intake and treatment system related to the presently disclosed embodiments. FIG. 2 illustrates an enlarged cross section of the intake part in FIG. 1. These figures illustrate how a membrane treatment unit is arranged in the water intake that is conventionally hollow.

Numeral 1 is the hull of a ship such as a tanker. The hull 1 has one or more intake parts 2 at the side part and the bottom part near the ship bottom in the engine section. An intake part 2 consists of a water intake 100 and a slit 101 which prevents foreign matters from flowing in and is usually installed at the side part and the bottom part of the hull 1 in the number of one respectively as illustrated.

During the intake of ballast water, sea water or fresh water around the hull 1 is sucked by a pump 4 from the water intake 100 of the intake part 2 via an intake pipe 3 and stored in a ballast tank 102. If necessary, the intake pipe 3 may have a filter 5.

The water intake 100 is provided with a membrane treatment unit 6 equipped with a plurality of membrane modules 600. Microorganisms of no smaller than a given size are separated by the membrane treatment unit 6 and smaller microorganisms (e.g. bacteria) are killed by means of ozone oxidization. Ozone oxidization treatment methods include, but are not limited to, injection of fine bubbles into the intake pipe 3. During the injection of water into the ballast tank 102, air originally existing in the ballast tank 102 is discharged into the atmosphere through a breather pipe 7.

During the intake of water, the intake part 2 to be used is switched between the one at the side part and the other at the bottom part, depending on how deeply the ship sits. It is not always necessary to actuate the pump 4 for taking water since only opening of a valve sometimes allows water in by the force of water pressure.

Alternatively, the ballast water is discharged through a drain pipe 8 by the use of the same pump 4 as used for taking the water after a valve is switched to reverse the flow. The drain pipe 8 has two exits, i.e. a drain pipe exit installed on the ship and the intake part, which are used alternately, as appropriate. During the drainage, air flows in through the breather pipe 7 as the ballast tank 102 loses water.

The above explanation is given to an embodiment in case of a ship having one train of the ballast tank 102 and the pump 4; however, it does not exclude other embodiments. A ship may have a plurality of trains of the ballast tank 102 and the pump 4.

Figure 3:
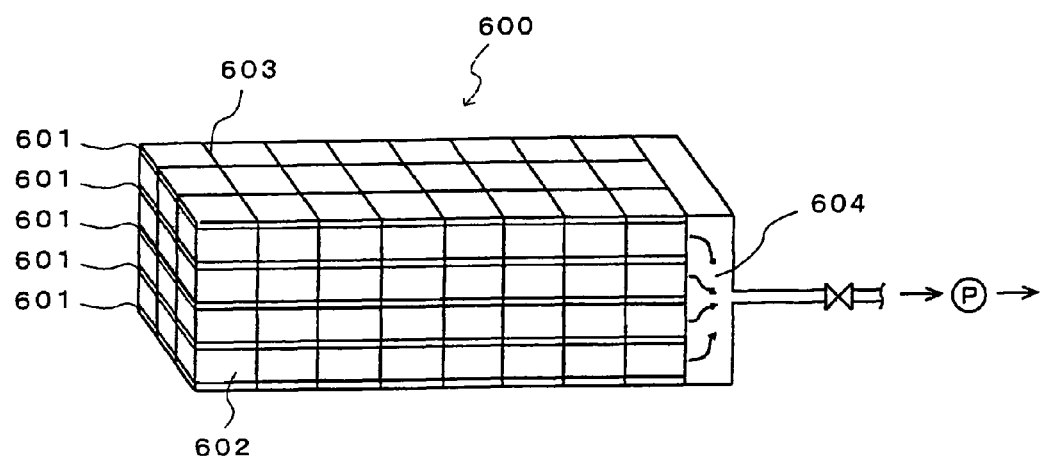
FIG. 3 is a perspective view illustrating an exemplary embodiment of membrane modules used in a membrane treatment unit.

FIG. 3 illustrates an embodiment of membrane modules to be used in the membrane treatment unit 6. These membrane modules are an example of cubic membrane modules.

The membrane modules have a construction of a plurality of flat membranes 601 and spacer members 602 alternately stacked, fixed and held in a mesh-state casing 603. Sea water or fresh water filtrated by the flat membranes 601 is collected in an water collecting part 604 and sent as ballast water to the ballast tanks.

Figure 4:
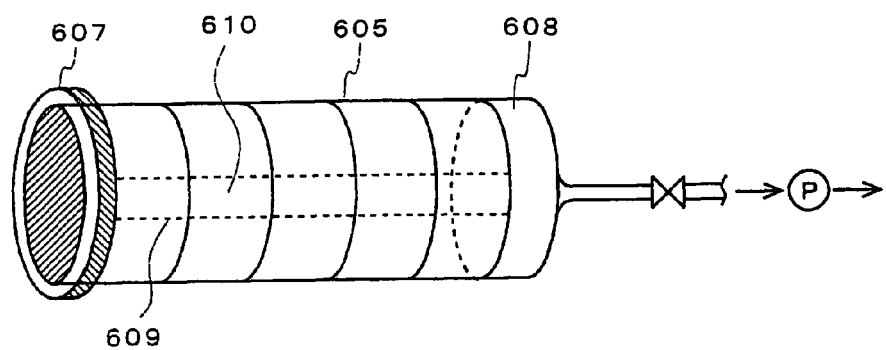
FIG. 4 is a perspective view illustrating an exemplary embodiment of the membrane modules.
Figure 5:
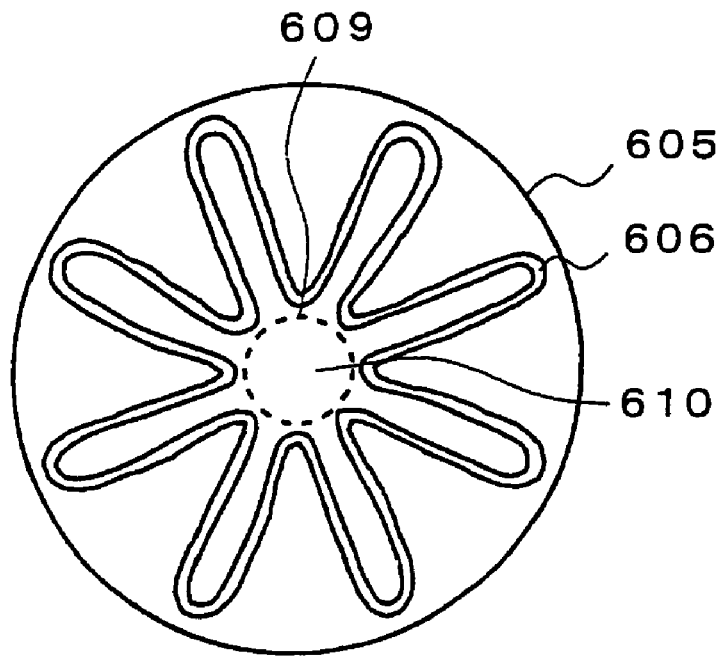
FIG. 5 is a cross-section view illustrating an exemplary embodiment of the membrane modules of FIG. 4.

FIG. 4 illustrates another embodiment of the membrane modules used in the membrane treatment unit 6. The membrane modules are an example of a cylindrical membrane module. FIG. 5 illustrates how a flat membrane is held in a membrane module.

The cylindrical membrane module has a flat membrane 606 held in a cylindrical mesh casing 605 in a pleated shape. The membrane module is sealed with a cap 607 at one end and provided with a water collecting part 608 at the other end. A filtrate water way 610 is installed in an inner cylindrical mesh-type casing 609.

Figure 6:
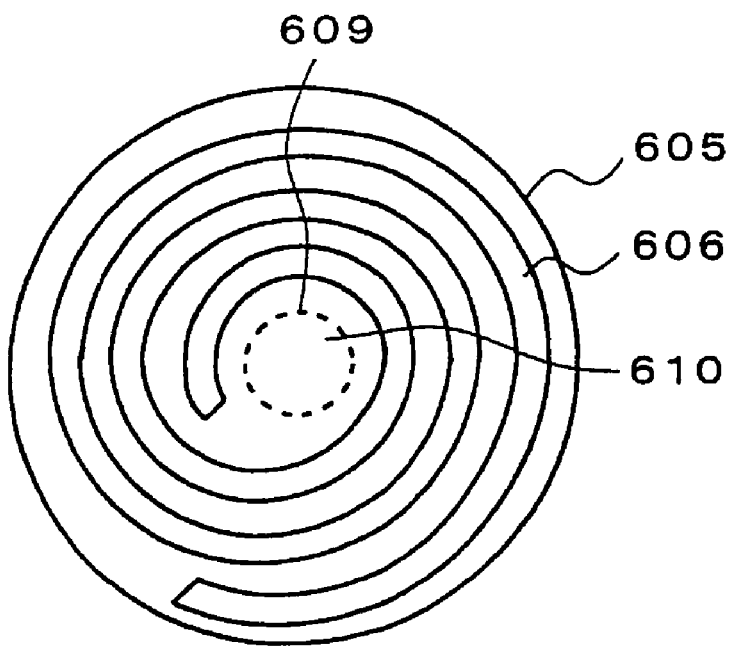
FIG. 6 is a cross-section view illustrating another exemplary embodiment of membrane modules of FIG. 4.

The cylindrical membrane module may also have the flat membrane 606 held in a spiral shape within the casing 605 as illustrated in FIG. 6.

The membrane modules 600 in the membrane treatment unit 6 have the function of separating microorganisms of no smaller than a given size. For the purpose of this specification, the given or larger size is 50 μm or more because the minimum size of zooplankton and phytoplankton required to be separated by the membrane modules 600 is 50 μm according to the effluent standard.

Now that plankton of 50 μm or more are separated, the separate water treated by the membranes includes only bacteria, etc. of less than 50 μm. Ozone treatment of this separate water, for example, will advantageously require less consumption of ozone, leading to a reduction in cost.

As mentioned above, the minimum separating function required of the membranes used in the membrane modules 600 is to separate plankton of 50 μm or more in the presently disclosed embodiments. However, it is preferable if the membranes have a further function of checking the invasion of smaller particles, microorganisms, and bacteria. More specifically, membranes (including, but not limited to, microfiltration membranes or cloths capable of checking the invasion of particles, microorganisms, and bacteria within the range of 0.1 to 50 μm) are preferable. It is because the costs for installation and running of a facility for ozone oxidation treatment of bacteria, etc. which have passed through membranes can be further reduced.

In preferred embodiments, a mechanism to protrude the above-mentioned membrane treatment unit 6 out of the hull 1 is provided to raise the water intake efficiency.

Absent a mechanism of protruding the membrane treatment unit 6 out of the hull 1, the membrane treatment unit having a size similar to the water intake 100 will generally cause larger resistance during the intake because of smaller clearance between the membrane treatment unit and the inner surface of the water intake 100. Conversely, if there is a mechanism of protruding the membrane treatment unit 6 out of the hull 1, the above-mentioned problem can be avoided and the surface area of the filtration membrane can be increased.

Figure 7:
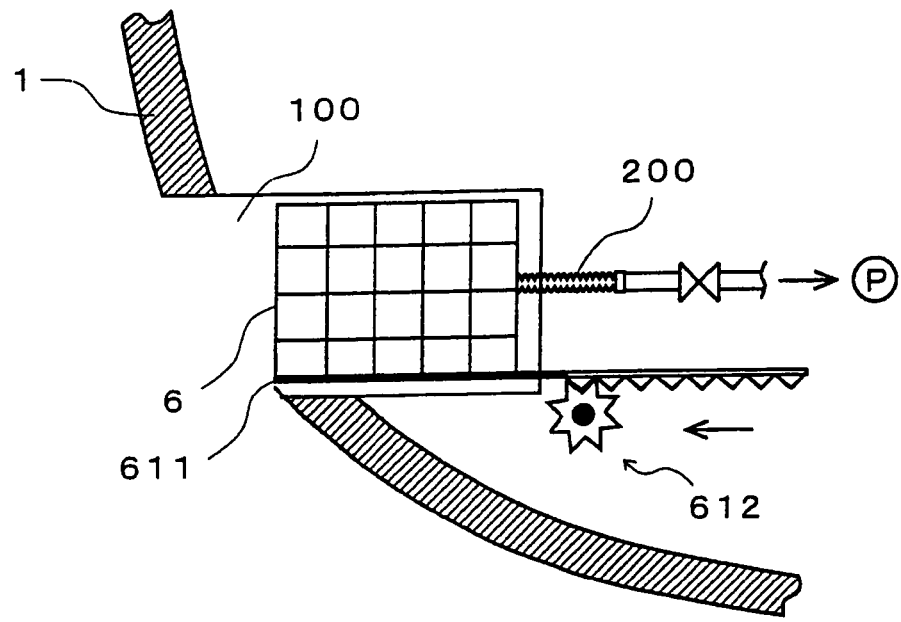
FIG. 7 illustrates an exemplary embodiment of a membrane treatment unit held in a water intake.

FIG. 7 illustrates how a membrane unit 6 held in a water intake 100. Numeral 611 in FIG. 7 is a mobile platform loading the membrane treatment unit 6. A mobile platform 611 is provided with a pinion rack mechanism 612. This construction allows the membrane treatment unit 6 to protrude outside because of protrusion of the mobile platform 611 out of the water intake 100.

Figure 8:
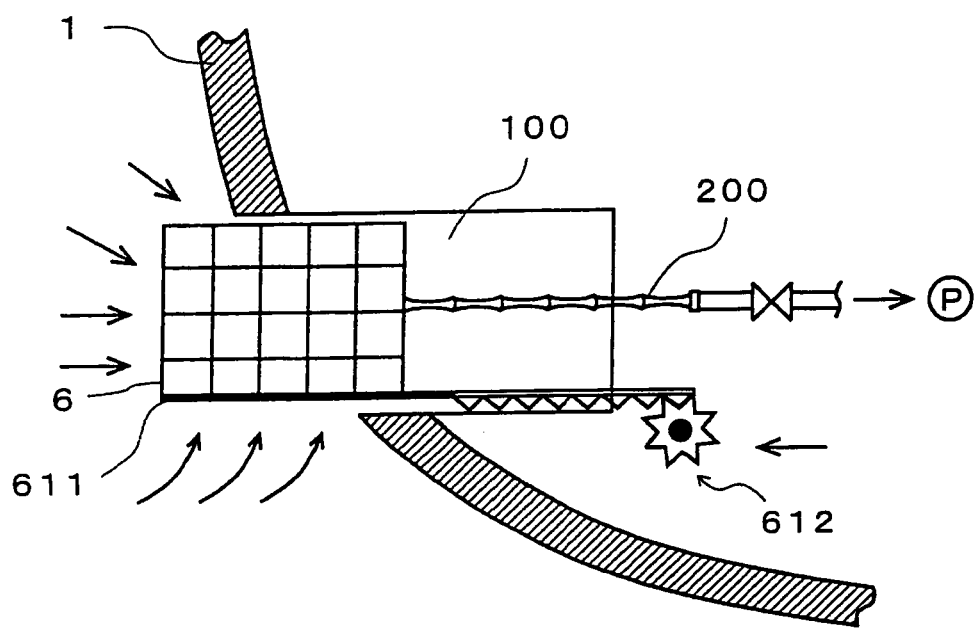
FIG. 8 illustrates an exemplary embodiment of a membrane treatment unit protruding outside (into the water)

FIG. 8 illustrates a membrane treatment unit 6 protruding outside (into the water).

The mechanism for enabling the protrusion is not limited to the pinion rack mechanism. Other suitable mechanisms to reciprocating it horizontally or vertically include, but are not limited to, a piston mechanism using either oil pressure or water pressure.

Adoption of the reciprocating mechanism as illustrated preferably selects flexible tube as a separate water pipe 200 stretching from the membrane treatment unit 6.

The water intake 100 in FIGS. 7 and 8 may be open at all times. In alternative embodiments, the water intake 100 may have a slit which can be opened and closed.

Figure 9:
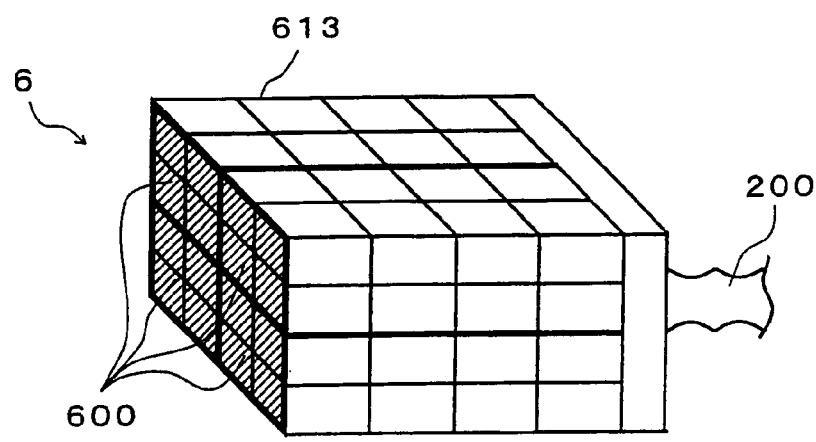
FIG. 9 is a perspective view illustrating an exemplary embodiment of a membrane treatment unit.

FIG. 9 illustrates an example of the membrane treatment unit 6 using cubic membrane modules. The cubic membrane treatment unit 6 includes a plurality of cubic membrane modules 600 held within a mesh-type casing 613.

Figure 10:
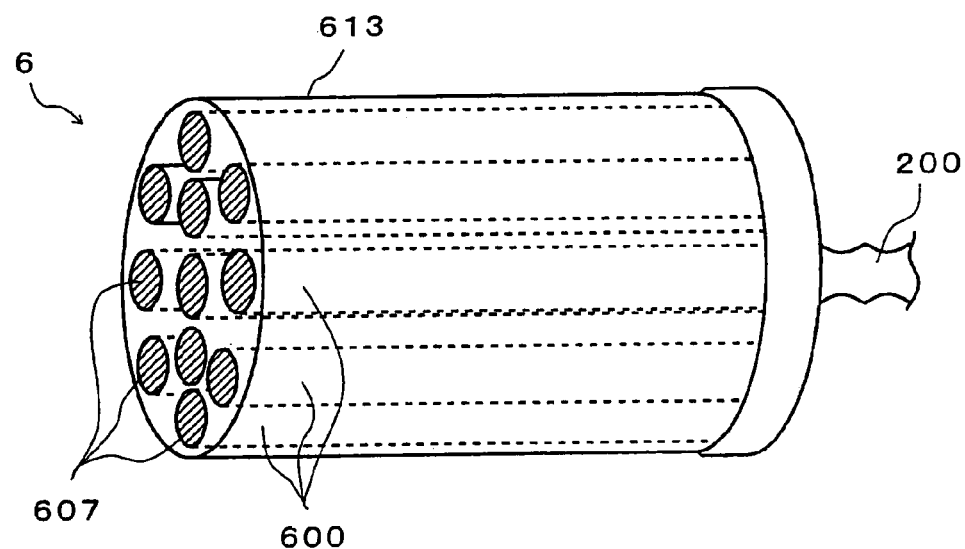
FIG. 10 is a perspective view illustrating another exemplary embodiment of a membrane treatment unit.

FIG. 10 illustrates an example of a membrane treatment unit 6 using cylindrical membrane modules. The cylindrical membrane treatment unit 6 has a plurality of cylindrical membrane modules 600 held within a mesh-type casing 613.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

The invention claimed is:

1. An onboard ship ballast water intake and treatment system for treating ballast water, comprising:
   a ballast tank disposed in a ship;
   a hull of the ship having one or more penetrations forming one or more water intakes;
   an intake pipe in fluid communication with the one or more water intakes and the ballast tank;
   a water intake pump disposed along the intake pipe and configured to draw sea water or fresh water from external of the hull into the one or more water intakes and provide sufficient pump head to discharge the drawn sea water or fresh water into the ballast tank through the intake pipe;

wherein the intake pipe comprises:
  one or more membrane treatment units configured to separate microorganisms with a size no smaller than 50 μm and to filter the water drawn into the one or more water intakes by the intake pump installed consecutively with the one or more membrane treatment units, at least a portion of the one or more membrane treatment units extending into the one or more water intakes; and
  an ozone oxidation treatment device disposed downstream of the one or more membrane treatment units in the intake pipe for sterilizing bacteria by injecting micro bubbles of ozone into the intake pipe; and
a mechanism for positioning at least a portion of the one or more membrane treatment units into the sea water or the fresh water outside the hull via the one or more water intakes, wherein the mechanism comprises a pinion-rack mechanism.

2. An onboard ship ballast water intake and treatment system for treating ballast water, comprising:
  a ballast tank disposed in a ship;
  a hull of the ship having one or more penetrations forming one or more water intakes;
  an intake pipe in fluid communication with the one or more water intakes and the ballast tank;
  a water intake pump disposed along the intake pipe and configured to draw sea water or fresh water from external of the hull into the one or more water intakes and provide sufficient pump head to discharge the drawn sea water or fresh water into the ballast tank through the intake pipe;
wherein the intake pipe comprises:
  one or more membrane treatment units configured to separate microorganisms with a size no smaller than 50 μm and to filter the water drawn into the one or more water intakes by the intake pump installed consecutively with the one or more membrane treatment units, at least a portion of the one or more membrane treatment units extending into the one or more water intakes; and
  an ozone oxidation treatment device disposed downstream of the one or more membrane treatment units in the intake pipe for sterilizing bacteria by injecting micro bubbles of ozone into the intake pipe; and
a mechanism for positioning at least a portion of the one or more membrane treatment units into the sea water or the fresh water outside the hull via the one or more water intakes, wherein the mechanism comprises a piston mechanism.

* * * * *